July 31, 1956   J. F. FURCINI   2,756,983
LOAD WEIGHING AND SUPPORTING MECHANISM
Filed March 26, 1951   2 Sheets-Sheet 1

James F. Furcini
INVENTOR.

BY *Clarence A. O'Brien*
*and Harvey B. Jackson*
Attorneys

July 31, 1956
J. F. FURCINI
2,756,983
LOAD WEIGHING AND SUPPORTING MECHANISM
Filed March 26, 1951
2 Sheets-Sheet 2
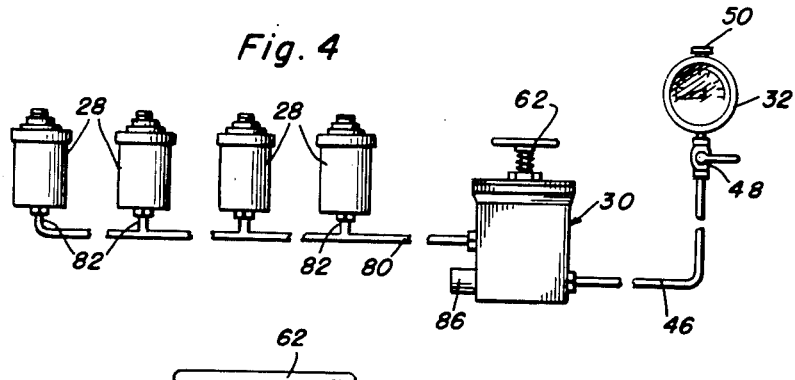
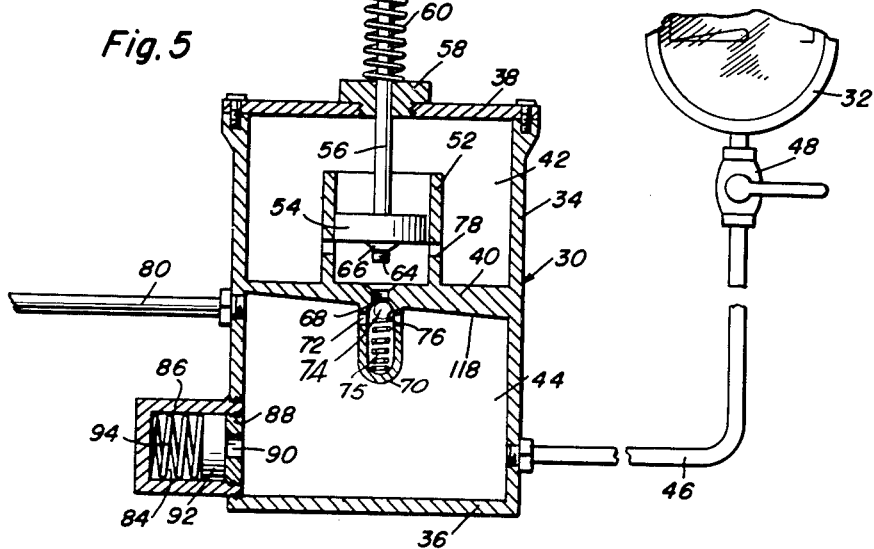
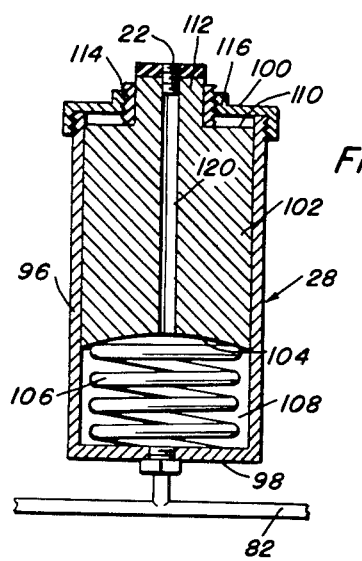
James F. Furcini
INVENTOR.

United States Patent Office 2,756,983
Patented July 31, 1956

2,756,983
LOAD WEIGHING AND SUPPORTING MECHANISM

James F. Furcini, Clairton, Pa.

Application March 26, 1951, Serial No. 217,435

4 Claims. (Cl. 265—40)

This invention comprises novel and useful improvements in a load weighing and supporting mechanism and more specifically pertains to a hydraulic attachment adapted to be associated in a novel and improved manner with the dump body and the supporting frame members of a truck to facilitate the weighing of the load upon the body and to support the body and its load in an improved manner.

The present invention is concerned with much the same general type of mechanism set forth in the prior patent of Schafer Patent No. 1,877,980 of September 20, 1932, for a Weight Indicator.

The present invention differs from that of Schafer in that it is a closed system which is self-contained and automatically operable as contrasted with Schafer's system requiring the use of a pressure pump to raise the load preparatory to obtaining a scale reading.

The primary objects of this invention are to provide a combined load supporting and weighing device of the closed or self contained hydraulic system type which shall be specifically adapted for use with trucks and truck bodies, and especially of the vertically pivoting dump type; which may be readily applied to conventional dump trucks with a minimum requirement for labor and alterations of the conventional truck constructions; which will mount a truck body upon a truck chassis with a cushioning and improved equalization of the load of the body upon the chassis.

A further very important object of the invention is to provide a dump truck weighing device which shall have an improved arrangement for bleeding air from the hydraulic system of the same.

A still further important object of the invention is to provide a dump truck construction and weighing device as set forth in the foregoing objects which shall be capable of being readily adapted to different types of trucks and which may be easily and advantageously adjusted to compensate for varying clearances between the truck body and the truck chassis.

Yet another important object of the invention is to provide a construction as set forth hereinbefore which shall have an improved arangement for supplying additional hydraulic fluid to the hydraulic supporting system either to replace wear, for bleeding air or gases, or to readjust the device.

A still further object of the invention is to provide an attachment which shall be specifically adapted to the vertically pivoting type of dump trucks and yet which shall support the truck body for a full floating movement upon the chassis and enable the body to be capable of vertical reciprocation within predetermined limits.

These, together with various ancillary features and objects of the invention, which will later become apparent as the following description proceeds, are attained by the present invention, a preferred embodiment of which has been illustrated, by way of example only, in the accompanying drawings, wherein:

Figure 4 is a diagrammatic view, parts being broken away, of the hydraulic weighing and load supporting attachment forming the subject of this invention;

Figure 5 is a detail view upon an enlarged scale, parts being shown in vertical section of the reservoir, pump and pump chamber forming a part of the invention and constituting the pumping unit of the same; and Figure 6 is a vertical central sectional detail view through one of the cylinder and piston jack units of the invention.

Referring now more specifically to the accompanying drawings, wherein like numerals designate similar parts throughout the various views, the numeral 10 indicating generally a conventional form of dump truck having the customary chassis including the customary channel iron member 12 constituting supporting members of the chassis, and which normally receive and support a truck dump body 14.

Figure 2:
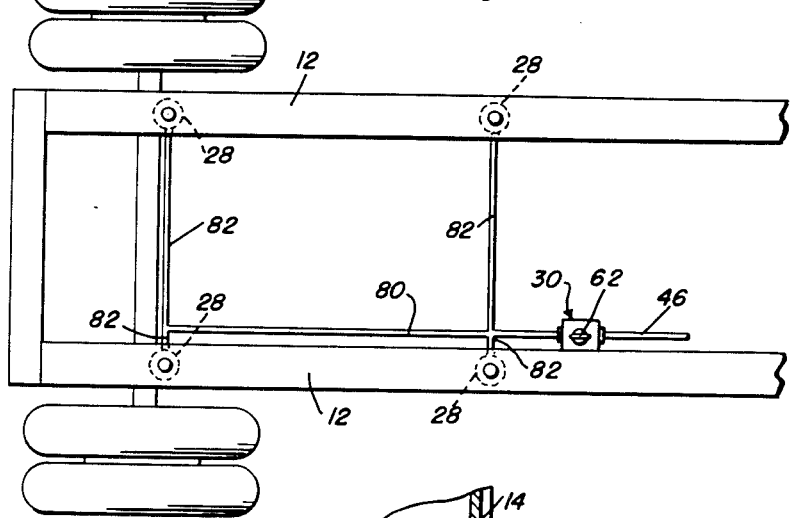
Figure 2 is a fragmentary top plan view of a portion of the truck chassis of Figure 1, parts being removed.

As will be better apparent from Figure 2, the bottom 16 of the dump body 14 is carried by longitudinally extending channel iron beams 18 constituting bolsters, and which normally are adapted to rest upon the support members 12 when the truck body is in its lowered position.

In accordance with conventional practice, the support members 12 are provided with fulcrum or hinge brackets 20 adjacent their rear ends which are apertured to receive pivot pins 22 by means of which the rear portions of the bolsters 18 are pivotally supported upon the support members 12 to permit vertical pivoting movement of the body 14 during the dumping operation of the same. It is of course understood that the usual power mechanism is provided for effecting the tilting or dumping movement of the truck body about its pivot pins 22, but since this mechanism is of conventional design, illustration and description of the same is believed to be unnecessary.

The basic or fundamental concept of this invention resides in operatively interposing between the support members 12 and the bolsters 18 of the body 14 a hydraulic system and mechanism by means of which the body 14 is floatingly mounted upon the support members 12 both to improve the distribution and support of the load of the body upon the support members and also to enable easy ascertaining of the weight of the body and its contents.

In accordance with this invention, the hinge connection of the body to the support members at 22, 20, is slightly modified so as to permit a vertical rectilinear reciprocation, to a limited extent, of the body with respect to the support members. For this purpose, the aperture in the fulcrum bracket 20 receiving the pivot pin 22 is vertically slotted at 24 so as to permit the hinge pin to be capable of a vertical rectilinear reciprocation with respect to the bracket 20. Thus, by virtue of the slot 24, the entire body 14 is capable of a limited vertical displacement as set forth hereinafter while remaining in a position parallel to its rest position and with respect to the upper surface of the support members 12 upon which the body normally rested before the introduction of the attachment of the present invention.

Since the body is floatingly mounted upon the support members 12 when the present invention is applied thereto, it is deemed preferable to provide guiding and retaining means to prevent sidewise movement of the body with respect to the support members when the former is elevated above the latter by the use of this invention. For this purpose, the bottom 16 of the body has been welded or otherwise fixedly secured thereto depending plates 26 which are likewise secured to the sides of the bolsters 18 and which plates are adapted to slidingly embrace the outside vertical surfaces of the support members 12 when the body is at or near its lowered position. The plates 26 serve as guides during the raising and lowering tilting movement of the body; serve as retainers to prevent sidewise or lateral displacement of the body with respect to the support members; and finally, serve as a housing or protective means for the hydraulic weighing and supporting mechanism which is operatively connected with the body and support members, as set forth hereinafter.

The hydraulic supportng and weighing assembly forming the subject of this invention, consists of a plurality of cylinder and piston jack units each indicated generally by the numeral 28 and which are operatively connected between the bolsters 18 of the truck body and the support members 12 for supporting the former upon the latter. In addition, the hydraulic assembly includes a casing 30 which forms a combined hydraulic fluid reservoir pressure equalizing and pump chamber as set forth hereinafter, together with a weighing scale 32.

Referring now chiefly to Figure 5, it will be seen that the unit 30 conveniently comprises a cylindrical casing 34 having a bottom wall 36 and a removable top 38, this casing having a transversely disposed partition 40 intermediate its ends which thus divides the interior of the casing into an upper chamber 42 constituting a fluid reservoir and a lower or pressure equalizing and pump chamber 44.

If desired, the partition 40 could be separately formed and removably inserted in and secured to the walls of the casing 34 or could be integrally constructed as shown. It is merely essential for the purposes of this invention that the partition shall divide the interior of the casing 34 into the two compartments as set forth hereinabove, and provide a controlled communication between these compartments in a manner to be now described.

A conduit 46 serves to connect the lower chamber 44 to the weight scale or gauge 32, there being provided a manual shut-off 48 to be disconnected from the gauge or scale 32 when the services of the latter are not required, thereby protecting the scale from injury which might arise from shocks transmitted by the hydraulic fluid of the system.

The gauge 32 may be of any desired character, and may be provided with an adjusting knob 50 to permit the scale to be calibrated or adjusted for various weights of truck bodies, so that a direct reading of the net weight of the load of the truck may be obtained if desired.

Referring now again to the construction of the unit 30 as shown in Figure 5, it will be seen that partition 40 is provided with an upstanding cylindrical barrel 52 which is disposed within the reservoir 42, and which is preferably open at its top. A pump piston 54 is slidably received within the pump barrel 52 and is secured to a pump rod 56 which extends upwardly through a removable gland or packing nut 58 screw threadedly engaged in the top 38. A compression spring 60 surrounding the pump rod 56 is disposed between the packing gland 58 and the handle 62 of the pump rod to thereby yieldingly urge the pump piston to the upper end of its stroke. The pump rod 56 extends slightly below the piston 54, and has a screw threaded extremity 64 which together with a conical nut 66 is adapted to coact with a seat in the partition 40.

The partition is provided with an internally threaded passageway or bore 68 which is screw threaded to receive the threaded extremity 64 of the pump rod, and which has a tapered seat to seat and receive the seat 66. Thus, when the pump piston is in its lowered position, the piston rod 56 may be rotated to cause the screw threaded extremity 64 to engage in the threads of the bore 68 and thereby retain the pump piston and rod in their lowered position and effectively seal the passage through the partition.

Either integrally or separately attached to the lower side of the partition 40 is a check valve cage 70 having discharge ports 72. A non-return check valve such as a ball 74 is loosely received in the cake 70, and is adapted to be urged, by spring 75, to normally seat against a complementary valve seat 76 formed at the exit end of the internally threaded bore or passageway 68.

The cylinder walls 52 of the bleed pump cylinder are provided with inlet ports 78 which open into the reservoir 42, and are so placed that the same are uncovered by the piston 54 in the upper position of the latter, but are closed as the piston moves downwardly below these ports.

It will now be apparent that upon reciprocation of the pump piston 54, hydraulic fluid will be drawn into the pump cylinder barrel 52 through the ports 78 on the upper stroke of the piston 54, and on the downstroke of the same will be discharged through the bore 68 and port 72 into the lower chamber 44.

A fluid pressure delivery conduit 80 communicates with the lower chamber 44, and by suitable branch conduits 82 communicates with each of the hydraulic cylinder and piston jack units 28 for transmitting fluid pressure between the jack units and the pressure chamber.

Since it is contemplated that the entire weight of the truck body and its load shall be supported upon the jack units 28 and the hydraulic piston connected therewith, it is obvious that jars and shocks arising from bouncing or bumping of the truck and its contents will be transmitted by the hydraulic system into the member 30. To provide a cushion for such jars and shocks, it is preferred to provide an expansion chamber 84 which may be formed in a cylinder 86 externally threaded for engagement with a wall of the pressure chamber 44, and having an apertured externally threaded closure plate 88 engaged within the cylinder 86. The aperture of the plate 88, indicated at 90 communicates with the interior of the pressure chamber 44 for transmitting fluid pressure therebetween.

Slidably received within the cylinder 86 is a piston 92 which is yieldingly urged against the plate 88 as by a compression spring 94. The tension or strength of the spring 94 is such that it will normally retain the piston 92 in the position shown in Figure 5 under the load carried by the truck body 14, but will yield as this load is varied by shocks, bumping or the like, to thereby cushion the system.

Reference is now made more specifically to Figure 6 for an understanding of the particular construction of the cylinder and piston jack units 28.

Each of the jack units 28 preferably comprises a cylinder 96 having a closed bottom wall 98 and an open upper end provided with a detachable cylinder head or cover 100 which is screw threadedly engaged upon the externally threaded upper end of the cylindrical barrel 96. Slidably received within the cylinder 96 is a piston 102 having a concaved bottom surface 104 together with a compression spring 106 disposed between the surface and the bottom wall 98 for yieldingly urging the piston 102 into its upward position.

Preferably the fluid supply conduits 82 communicate with the hydraulic jack chamber 108 within the cylinder through the bottom wall 98 as shown. The hydraulic fluid of the piston thereby serves to maintain the piston 102 in a raised position, whereby the weight of the load carried by the piston will be transmitted through this hydraulic column and the associated conduits to the pressure chamber 44 and from thence by the conduit 44 to the gauge 32. It is contemplated that the spring 106 will normally be of insufficient strength to support the weight of the truck body 14 and its contents, although if desired this spring could be utilized to some extent to offset or balance a part of the weight of the truck body.

The piston 102 at its upper end is provided with an annular shoulder 110 which constitutes an abutment surface for limiting the upward movement of the piston as set forth hereinafter. Extending axially above the piston is an upper portion 112 which is slidingly received in an adjusting gland or sleeve 114. The latter is externally threaded through an enlarged central boss 116 of the cover 110 and constitutes a guide bushing for the neck portion 112 of the vertically reciprocating piston 102, and at its lower end is adapted to abut or engage the abutment surface 110 and thereby limit the upward movement of the piston. Obviously, by adjusting the gland 114, the range as well as extent of vertical movement of the piston may be readily adjusted from the exterior of the unit.

Figure 1:
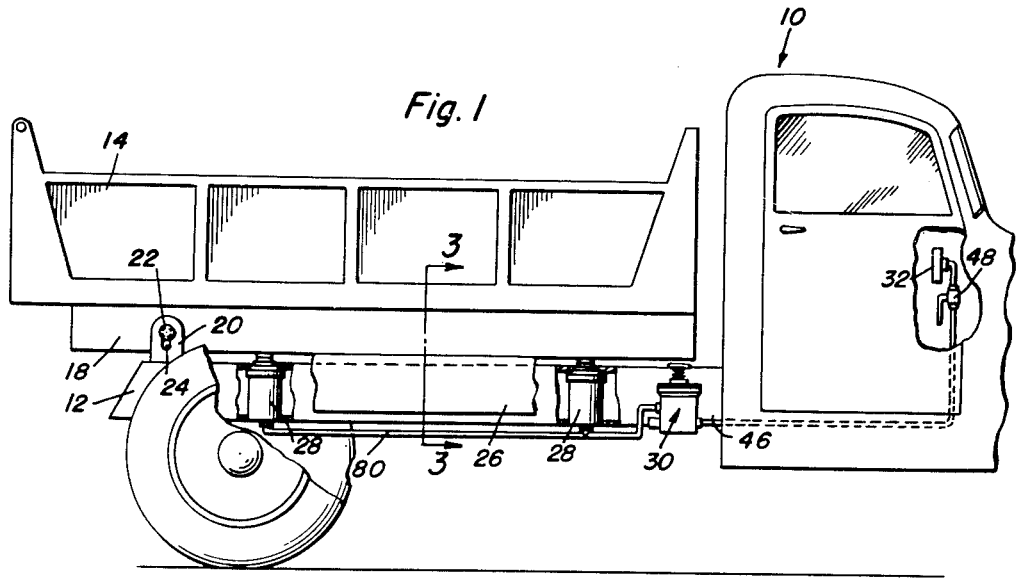
Figure 1 is a fragmentary side elevational view showing a conventional form of dump truck to which the principles of this invention have been applied, parts being broken away.

As suggested in Figures 1 and 2, each of the jack units 28 is illustrated as being recessed into the support members 12 adjacent the four corners of the truck body, with the neck portions 112 of the pistons extending above the upper surfaces of the support members 12 for direct abutting engagement upon the under surfaces of the bolsters 18.

It will now be evident that the jack units can be attached to the support members in any desired manner, either by recessing the same within the support members as suggested in Figure 2; by mounting the same upon suitable support brackets on the side of the support members or any other desired way, the invention being not limited to any particular manner by applying the jack units. It is merely sufficient for the purposes of this invention that the jack unit shall be supported by the support members 12 and shall have the piston extensions 112 engaging bolsters whereby when hydraulic fluid is supplied by gravity head from the casing 30 or pumped into the system, the truck body may be vertically elevated and supported upon this hydraulic system from the support members but out of contact therewith.

Figure 3:
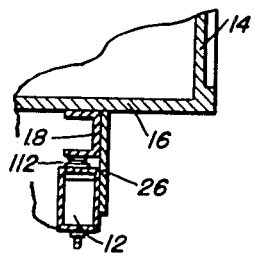
Figure 3 is a vertical transverse sectional detail view, taken substantially upon the plane indicated by the section line 3—3 of Figure 1.

It will now be apparent that as so far described, the guide plates 26, see Figures 1 and 3, would serve to enclose and protect the space between the bottom 16 of the truck body and the support members 12 and the jack units interposed therebetween. This will serve materially to increase the life of the jack units by preventing the splashing of snow, mud or the like against the exposed portions of the working elements of the same.

The operating efficiency of hydraulic systems are deleteriously affected by the accumulation of air or gases in the hydraulic fluid, usually in the form of occluded gases. To overcome this difficulty it is consequently necessary to bleed or scavenge the system at intervals and when servicing or repairing the same in order to remove these gases, in order that the hydraulic column or body of fluid shall be unyielding and incompressible in its operation. The present invention comprises a simplified but effective means for readily venting all air from the system and thus facilitates the initial filling of the system and the servicing or replenishing of the hydraulic fluid of the same. For this purpose, the partition 40 has its under surface, which constitutes the top wall of the pressure chamber 44, inclined or sloping as indicated at 118 in Figure 5. This partition slopes upwardly with its high point adjacent the connection of the delivery conduit 80, so that any air accumulating in the pressure chamber 44 will collect at the high point and move through the upwardly inclined discharge conduit 80, and eventually will find its way into the jack chambers 108. From thence, the air will collect beneath the concaved surface 104 and will be vented through the axially disposed air vent passage 120 which opens through the upper end of the extension or neck of the piston 102. This passage is customarily closed by a screw 122 when it is desired to vent air from the system by forcing fluid through the conduit system until the same escapes through the air bleed passage 120.

It should be observed that the extension 112 is of uniform cross section so that in the event that insufficient fluid is in chamber 108 to support the truck body and its load, the piston may be forced downwardly until the bolster 18 directly rests upon the sleeve 114.

It should be here observed that in normal usage only a very slight vertical movement of the truck body 14 with respect to the support members 12 is contemplated, the amplitude of this movement being in the order of about one-eighth to three-eighths of an inch. This amplitude could of course be varied in accordance with particular requirements and characteristics of the truck to which the system is to be applied. The best advantages of this invention are realized when this vertical movement is just sufficient to move the pivot pins 22 vertically in their slots 24 so as to insure that the entire weight of the truck body and its contents will be supported by the four or more jacks 28 rather than upon any part of the support members 12 or the pivot pins 22 directly. With the truck body so elevated upon the hydraulic supporting means, it is evident that at any time the gauge 32 is rendered operative by turning the control valve 48, that an immediate reading as to the weight of the truck body or load can be obtained.

Moreover, by supporting the truck body upon interconnected hydraulic jacks at spaced points along the same, it is evident that the equalization of the hydraulic pressure between the various jack units would tend to equalize the distribution of the load of the truck body over the frame, a result not possible of attainment where the truck body is directly resting upon the frame and the latter may have become warped or distorted during usage, resulting in uneven imposition of loads upon the same.

The present invention may be readily applied to existing types of dump trucks by merely vertically lengthening the aperture of the pivot pin hole or bracket 20; by applying the guide plates 26 and by applying the hydraulic system of Figure 4 to the support members.

With the device installed properly upon a dump truck chassis, the dump body is raised as in the usual manner for dumping. This removes the weight of the dump body from the jacks and their pistons 102 thus rise to their uppermost positions, under the influence of the springs 106, and/or the gravity head of the fluid from the casing 30, the force of the spring 94 and piston 92 or the pressure produced by the pump piston 54.

However, the pump piston 54 is normally employed solely as a bleed or scavenging pump, to promote, force or assist in causing a flow of hydraulic fluid from the pressure chamber 44 through the piston bleed passages 120 to discharge any air or gas accumulation from the system. Actually, the system, once the reservoir 42 is filled, is capable of satisfactory operation without the bleed pump.

After the system is free of air, the dump body is lowered, coming to rest upon the pistons which are thereby slightly depressed against the resistance of the spring 94. The pressure of the system is now augmented by the weight of the body, and its subsequent load, which can now be read upon the gauge.

Each time the dump body is raised, the pistons of the jacks rise to their uppermost position, to again fill the chambers 108 with fluid, and are again depressed when the body is lowered, in readiness for another weighing operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

Having described the invention what is claimed as new is:

1. In a dump truck, a tilting dump body and supporting members, pivot means securing the body to said members for vertical pivoting movement between a substantially horizontal load carrying position and an inclined dumping position and for a limited vertical, non-tilting translatory movement, hydraulic means operatively associated with the body and members for supporting the former in its load-carrying position above the latter, said hydraulic means including a plurality of jacks operatively engaging the body and members at spaced locations for distributing the load of the body in its load-carrying position to the members equally between said spaced locations, said hydraulic means including a hydraulic system maintained under pressure and sealed from the atmosphere, said system including said jacks, a casing having a fluid pressure chamber, means for producing and maintaining pressure in said chamber and conduits providing free communication between said jacks and chamber, the arrangement being such that the body in its load-carrying position will be supported in free floating position solely by said jacks above the support members for limited vertical translatory movement, said casing including a partition dividing its interior between said pressure chamber and a fluid reservoir, a port in said partition providing communication between the reservoir and the pressure chamber, said pressure producing means including a pump plunger disposed in said reservoir, means on said plunger for closing said port, said last means comprising complementary threads in said port and on said plunger.

2. The combination of claim 1 including a resiliently yieldable fluid pressure expansion member carried by said casing and communicating with the pressure chamber for cushioning the hydraulic means against shocks and jars from said body.

3. The combination of claim 1 including a cylinder rising from said partition and surrounding and communicating with said port and with said reservoir, said plunger being reciprocably mounted in said cylinder.

4. The combination of claim 1 including air bleed and vent means disposed in each jack.

References Cited in the file of this patent

UNITED STATES PATENTS

| | | |
|---|---|---|
| 1,227,506 | Troll | May 22, 1917 |
| 1,282,890 | Livingston | Oct. 29, 1918 |
| 1,354,785 | Strand | Oct. 5, 1920 |
| 1,532,835 | Schlaboch | Apr. 7, 1925 |
| 1,615,267 | Gay et al. | Jan. 25, 1927 |
| 1,877,980 | Schafer | Sept. 20, 1932 |
| 1,910,345 | Levitt et al. | May 23, 1933 |
| 2,125,483 | Blanchard | Aug. 2, 1938 |
| 2,313,156 | Kratt | Mar. 9, 1943 |
| 2,365,589 | Poston et al. | Dec. 19, 1944 |
| 2,452,124 | Huston et al. | Oct. 26, 1948 |
| 2,534,766 | Girdwood-Blackett | Dec. 19, 1950 |
| 2,568,220 | Christopher | Sept. 18, 1951 |
| 2,586,137 | Yoder et al. | Feb. 19, 1952 |

FOREIGN PATENTS

| | | |
|---|---|---|
| 112,571 | Great Britain | Jan. 17, 1918 |
| 472,793 | Great Britain | Sept. 30, 1937 |